Figure 1:
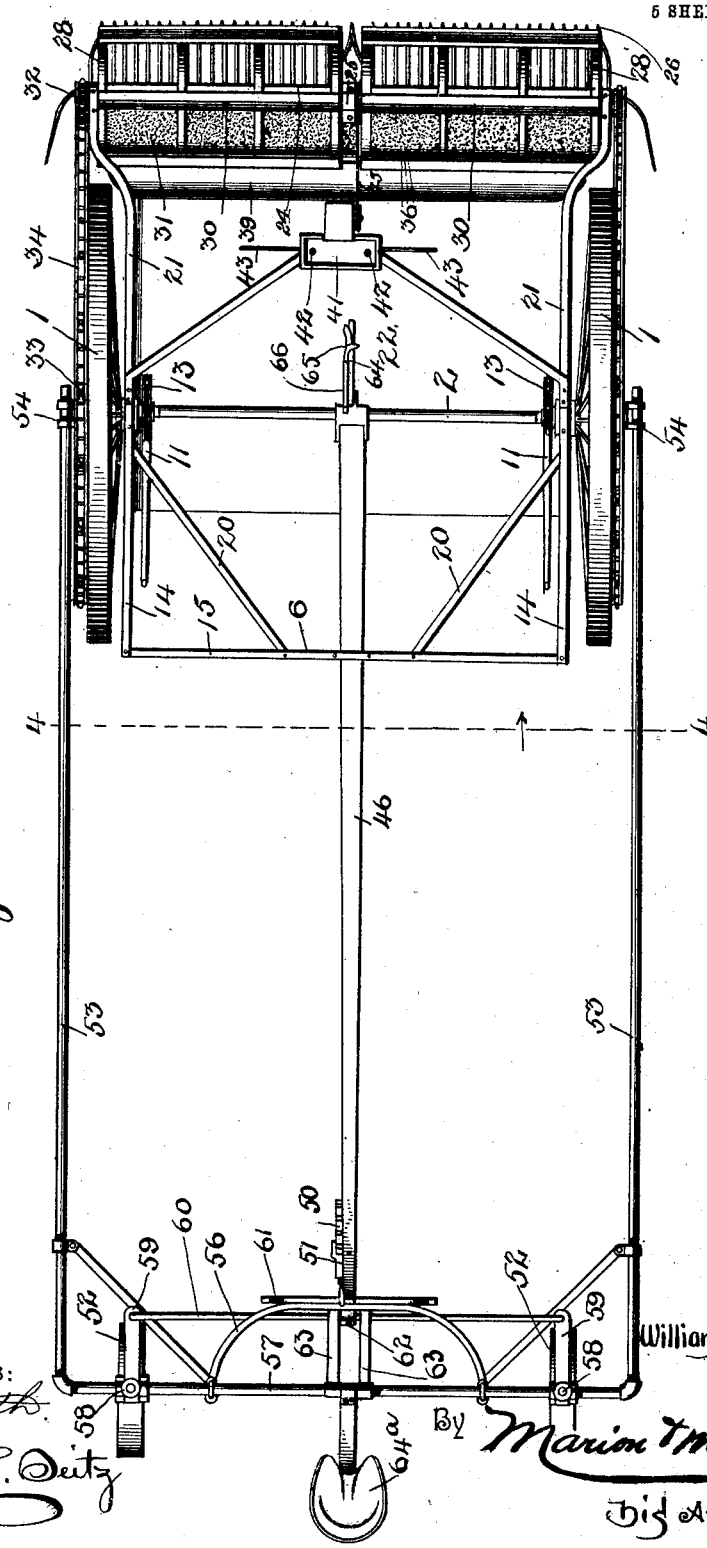

No. 719,482. PATENTED FEB. 3, 1903.
W. MALONEY.
GRAIN THRESHER.
APPLICATION FILED APR. 28, 1899.
NO MODEL. 5 SHEETS—SHEET 1.

Witnesses:
William Maloney,
Inventor,
By Marion & Marion
his Attorneys.

No. 719,482. PATENTED FEB. 3, 1903.
W. MALONEY.
GRAIN THRESHER.
APPLICATION FILED APR. 28, 1899.
NO MODEL. 5 SHEETS—SHEET 3.

Witnesses:
Horace G. Deitz

William Maloney, Inventor,
By Marion & Marion
his Attorneys.

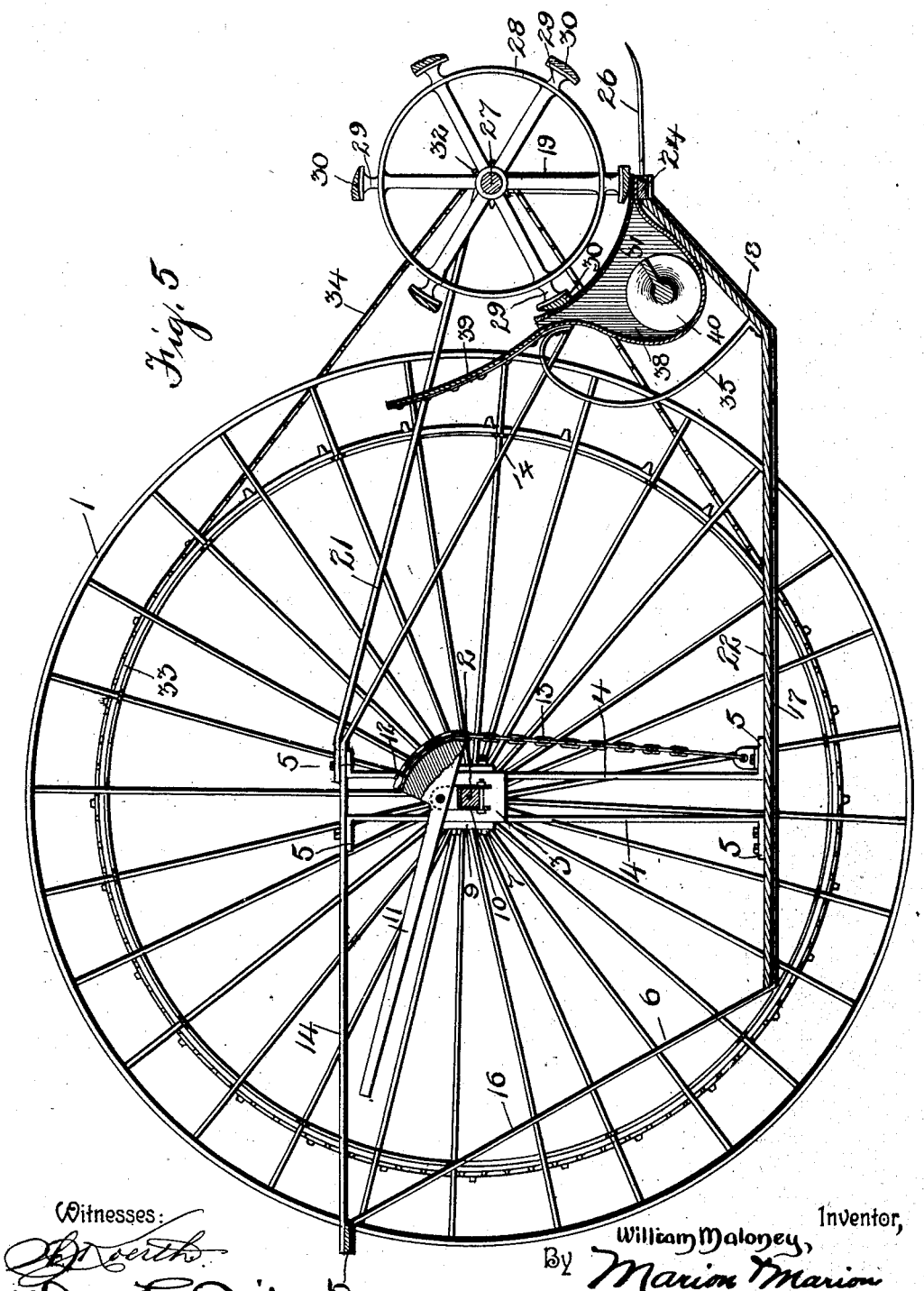

No. 719,482. PATENTED FEB. 3, 1903.
W. MALONEY.
GRAIN THRESHER.
APPLICATION FILED APR. 28, 1899.
NO MODEL. 5 SHEETS—SHEET 5.
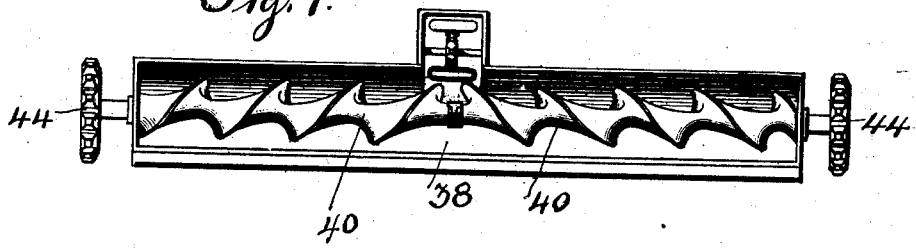
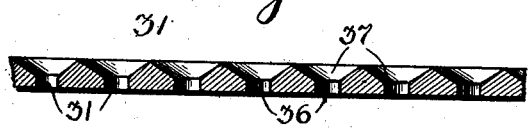
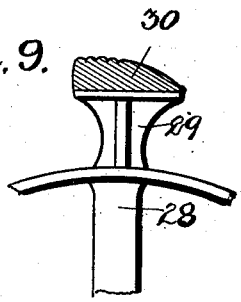
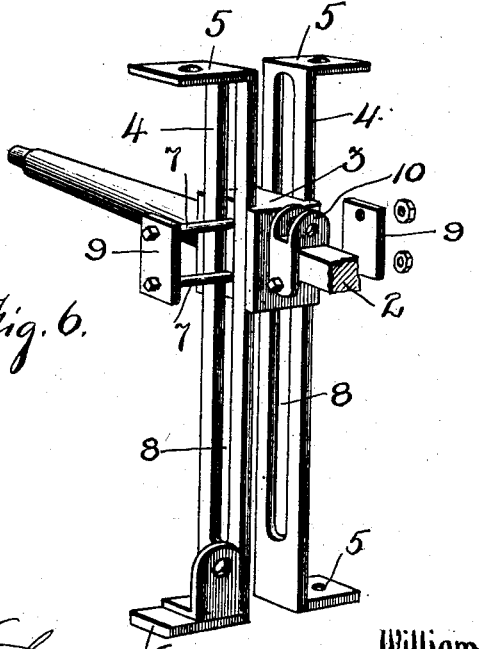
Witnesses: William Maloney, Inventor,
By Marion Marion
his Attorneys.

UNITED STATES PATENT OFFICE.

WILLIAM MALONEY, OF SHERBROOKE, CANADA, ASSIGNOR OF ONE-HALF TO MAXWELL S. INGLIS AND ISAAC PITBLADO AS INDIVIDUALS AND AS TRUSTEES, OF WINNIPEG, CANADA.

GRAIN-THRESHER.

SPECIFICATION forming part of Letters Patent No. 719,482, dated February 3, 1903.

Application filed April 28, 1899. Serial No. 714,901. (No model.)

*To all whom it may concern:*

Be it known that I, WILLIAM MALONEY, a subject of Her Majesty the Queen of Great Britain, residing at Sherbrooke, county of Sherbrooke, Province of Quebec, Canada, have invented certain new and useful Improvements in Grain-Threshers; and I do hereby declare that the following is a full, clear, and exact description of the invention, such as will enable others skilled in the art to which it appertains to make and use the same.

My invention relates to improvements in grain-threshers.

The object of my invention is to provide a construction of this character by means of which the grain can be threshed while standing in the field, the cereals being removed and the straw left standing.

A further object is to provide a construction by means of which the grain is bagged as it is threshed.

A further object is to provide a construction in which the threshing mechanism is divided, receiving its power from different parts of the machine, enabling the harvester to have its course varied without varying the operative usefulness of the threshing mechanism, the speed of the threshing mechanism being accommodated to the movement of the harvester over the field.

A further object is to provide mechanism for adjustably regulating the height of the threshing mechanism to enable the threshing of the grain, the stalks of which are of various heights.

A further object is to provide a construction in which the grain is threshed by the forcing of the grain from its shell with but slight destroying of the shell and its removal from the straw.

A further object is to provide a construction in which the grain is threshed without removing the heads from the straw.

A further object is to provide a construction by means of which the machine is supported and guided by means of two guiding-wheels mounted at the rear of the frame, said wheels acting in unison, said guiding mechanism also having its draft-poles located on the outer side of the draft-animals, forming an inclosed portion within which the animals are moving.

A further object is to provide a construction by means of which the grain will be threshed in an economical manner, which is light in weight, durable in construction, and simple and effective in operation.

To these and other ends my invention consists in the improved construction and combination of parts hereinafter fully described, and particularly pointed out in the appended claims.

Figure 2:
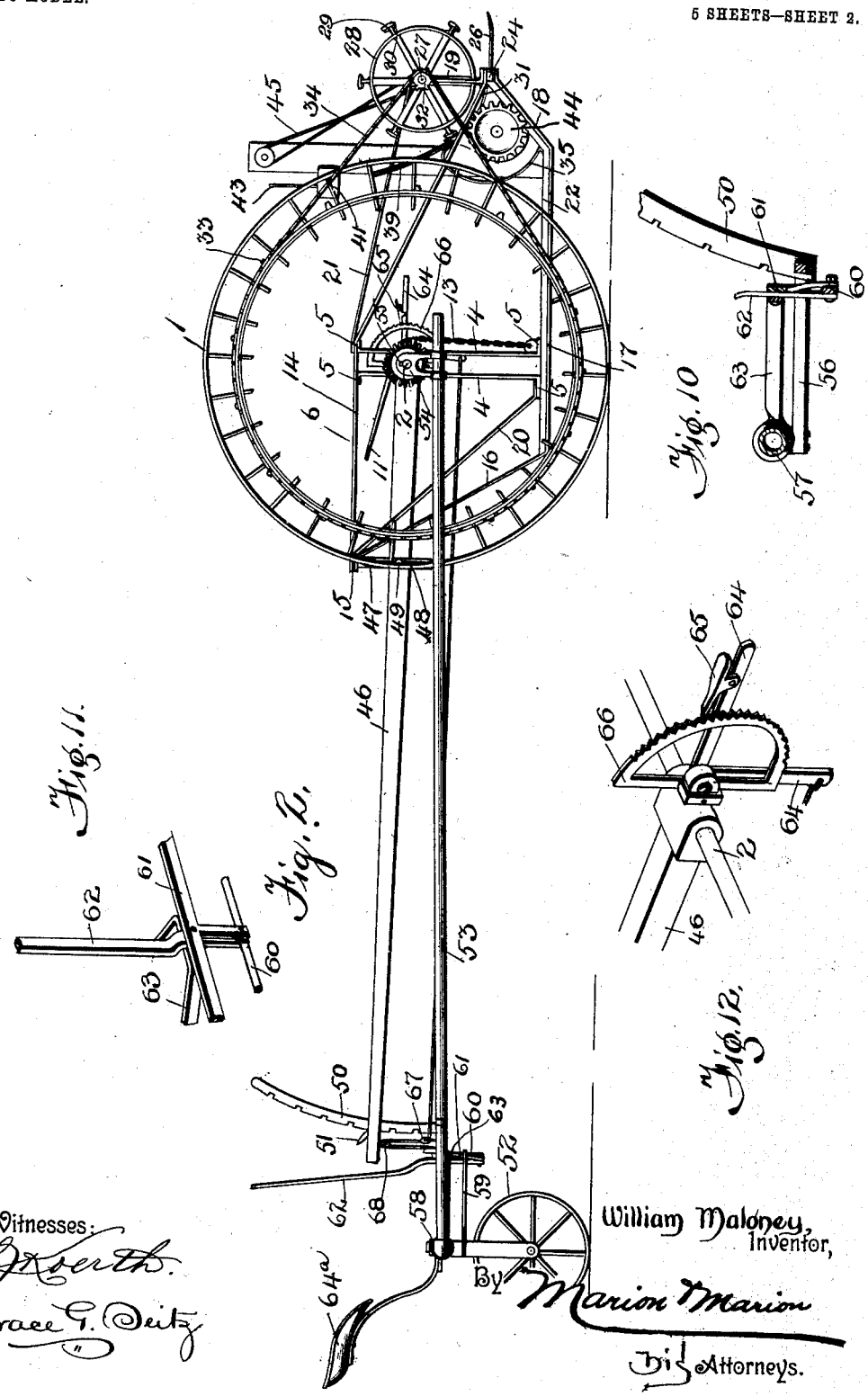
Figure 3:
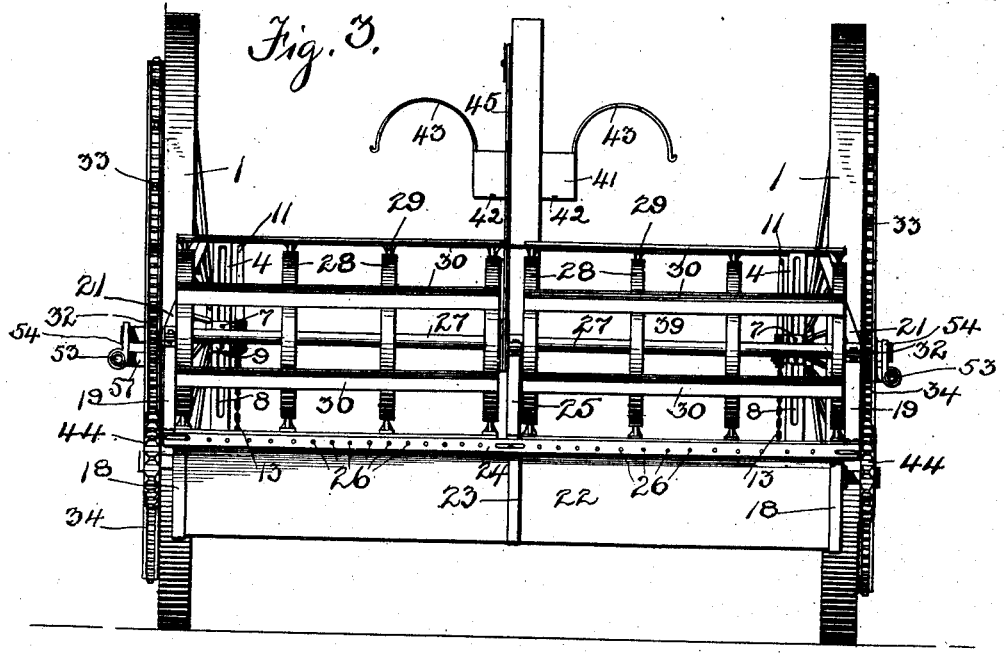
Figure 4:
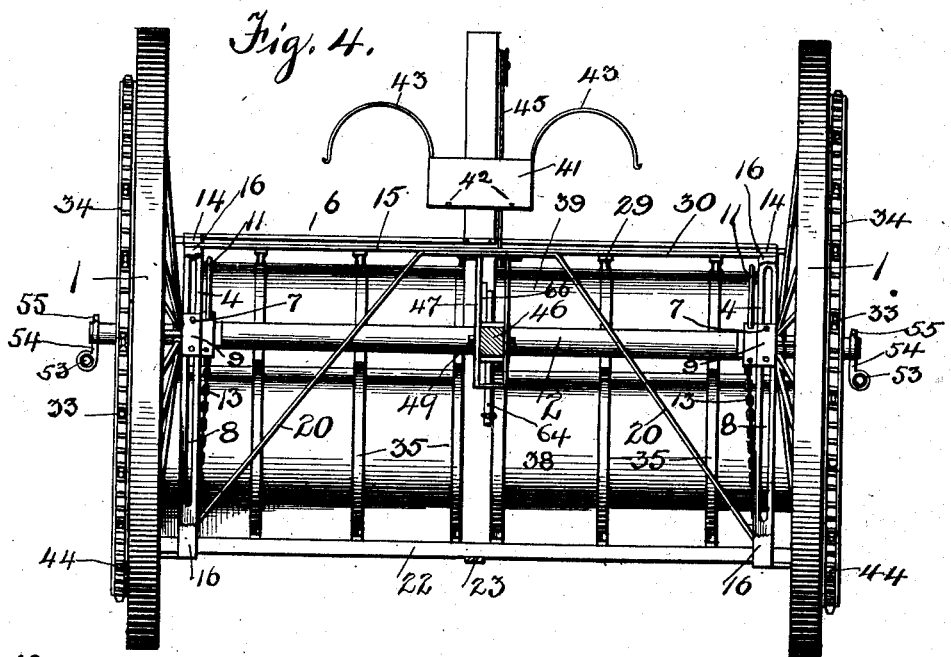

In the drawings, in which similar numerals of reference indicate similar parts in all of the figures, Figure 1 is a plan view of my improved thresher. Fig. 2 is a side elevation. Fig. 3 is a front elevation. Fig. 4 is a vertical cross-sectional view taken centrally of the machine on the line 4 4 of Fig. 1 looking toward the front. Fig. 5 is an enlarged vertical longitudinal section of the frame and threshing mechanism. Fig. 6 is a detail of the axle and its support. Fig. 7 is a detail of the conveyer. Fig. 8 is a detail showing the construction of the concave. Fig. 9 is a detail of a portion of the threshing-cylinder. Fig. 10 is a detail sectional view on the line 10 10 of Fig. 1. Fig. 11 is a detail perspective of some of the parts shown in Fig. 10. Fig. 12 is a detail of the means carried by the axle for regulating the angularity of the lever.

The harvesting of grain as now practiced is performed in various ways. These methods vary, consisting in cutting off the grain and binding it, after which it is threshed, in cutting off the heads of the grain, sacking the heads, and afterward threshing them, and the attempt has also been made to thresh the grain without removing the heads. To the latter class the present invention belongs, and its advantages will be hereinafter set forth. In constructions of this class the attempt has been made to subject the grain to the action of a toothed cylinder; but in so doing the loss of grain is considerable by reason of its flying from the head in every direction, being difficult to control. Another disadvantage lies in the fact that the heads are so mashed and mangled as to cause a great amount of chaff and portions of the head to be passed into the receiving-hopper with the grain. A further disadvantage lies in the fact that to give the cylinder its required speed it must be geared up to such an extent as to make necessary a great amount of power, making the first cost of the machine exceedingly great, as is also the cost of operating it.

In the present construction the threshing is accomplished by subjecting the head to sufficient pressure to cause it to be flattened, the pressure being sufficient to break the shell or pod of the grain and press it out of its shell, the grain not being mashed, but kept in its natural condition, the threshed heads being withdrawn with the stalk.

In the construction now to be described I have shown one method of carrying my invention into effect; but I desire it to be understood that I reserve the right to make such necessary modification and changes as may fall within the invention herein described, such changes falling within the spirit and scope of the invention as described in the appended claims.

1 designates the drive-wheels of my device, mounted at opposite ends of the axle 2, as best shown in Fig. 1. The axle 2 is provided on opposite sides, at a point a slight distance inside the wheels 1, with a slide-block 3, as best shown in Fig. 6, said slide-block serving to prevent the turning of the axle in addition to the adjustment now to be described.

4 designates a pair of vertically-extending guides, having their upper and lower ends bent laterally, as at 5, said guides being secured to the frame 6, hereinafter described. One of the slide-blocks 3 is mounted within each pair of guides, being secured therein by means of bolts 7, extending through vertical slots 8, formed in the guides, and through the slide-block, suitable plates 9, mounted on the bolts 7, serving to hold the guides fixedly in their adjusted positions. To raise the guides 4 and frame 6, with its contents, enabling their adjustment to a proper height, I provide a clip 10, secured to the axle, on which is pivotally mounted a suitable lever 11, having a hook 12, adapted to receive one of the links of a chain 13, having its lower end connected to the lower end of the guide 4. It will be readily seen that if the bolts 7 are loosened and the lever 11 depressed the guides 4 will be moved upwardly, causing the frame 6 to be raised. When the desired point has been reached, the bolts are tightened, holding the frame fixedly in its adjusted position. It is to be understood that the lever 11 and its connections are duplicated on opposite sides of the machine.

The frame 6 is skeleton in its formation, comprising the plates 14, connected to the upper ends of the guides 4 and extending forwardly and rearwardly therefrom, the rear ends being connected by the plate 15, the forward ends of the plates 14 being bent at an angle downwardly and extending to the front portion of the machine.

16 is a brace extending in an inclined direction downwardly and forwardly from the plate 15 and thence forwardly, as at 17. The front end of the portion 17 is bent upwardly, as at 18, and is secured to the bar 24, the junction forming the support for the vertically-extending bearings 19. Suitable supporting-braces 20 extend from the plate 15 to the forwardly-extending portion 17. A brace 21 also extends forwardly from the top of the slide 4 and is connected to the top of the bearings 19, as shown. A platform 22 is mounted on the portions 17, extending from side to side of the machine, and to this platform, centrally thereof, is connected a forwardly-extending brace 23, similar in configuration to the forwardly-extending portions of the plate 15, said brace having its front end connected to a bar 24, extending across the front end of the machine, the connection being central of the bar. The ends of the bar are connected to the support for the bearings 19, and said bar is also adapted to receive a central bearing 25, similar to the bearings 19. The front face of the bar 24 is provided with a series of forwardly-extending teeth 26, which are adapted to guide the heads of the grain backward onto and into the path of movement of the threshing-cylinders, hereinafter described, said teeth being adapted to straighten out any tangled portion of the grain that may be encountered during the movement of the machine.

Revolubly mounted in the bearing 19 and bearing 25 are shafts 27, on which are secured suitable wheels 28, having their periphery provided with suitable radially-extending lugs 29, to the outer face of which are secured suitable threshing-bars 30, formed substantially as shown in Fig. 9, the bar in that figure being shown in cross-section. As shown in said figure, the face of each bar 30 is formed with a plain surface and a corrugated surface, the latter being located in rear of the former, the corrugations extending longitudinally of the bar. In cross-section the bar increases in thickness from its front to its rear, the plain surface having the greater portion of this increase. This particular form of bar is of importance in that it causes a gradually-increasing pressure to be put on the grain-heads, the plain surface breaking the pods, while the corrugated surface separates the kernel from the pod. To provide the surface corrugated for its entire width would have a bad effect on the threshing, as there would be an intermittent increase of pressure on the grain-pod instead of a steady pressure, which ensues by the use of the plain surface at the commencement of the threshing movement. This will be clear when it is considered that the steady pressure increasing will irresistibly "push" the kernel rearward, aiding in the breaking of the pod, but without tending to destroy the kernel, while a corrugated surface would tend to attempt to violently force the kernel from the pod by successive "beating" with increased pressure, which would tend to mash the kernel instead of threshing it in a neat manner. As will be seen by referring to the drawings, the threshing-bars 30 extend laterally across the machine, being formed in two divisions, one on each side of a longitudinal center of the machine, said bars extending in a straight line across the wheels 28, thus causing the grain to be brought into contact with the concave plate 31, hereinafter described, at the same moment, each bar being adapted to thresh one row of the heads of the grain. While it is possible to operate the machine so that one row of heads will be acted upon by but one of the threshing-bars, yet it is possible that the machine in operation will have almost an entire revolution on one row of heads, it depending entirely on the rate of speed at which the shafts 27 are driven relative to the speed of the drive-wheels.

The shafts 27 are driven by means of a sprocket-wheel 32, mounted on the end of each shaft, this sprocket-wheel being operatively connected to a similar wheel 33, mounted on the drive-wheel, the connection being by means of a suitable sprocket-chain 34. It will be readily seen that the speed of the shaft 27 may be regulated by changing the sprocket-wheel mounted thereon. As each shaft 27 is mounted on opposite sides of the center and each has its own driving power, it will be readily seen that in making turns each threshing-cylinder will be driven at a speed corresponding to the speed of the drive-wheel 1, so that there will not be any liability of a number of rows of heads being passed by without being threshed.

The position of the concave plate 31 is substantially as shown in Fig. 5, the forward end of said plate extending a small distance in front of the vertical center of the threshing-cylinder, said concave plate extending rearwardly with approximately the same curvature as the plane of the path of movement of the threshing-cylinder, the rear end of said concave plate being slightly closer to said path of movement in order that a slight tightening may take place between the threshing-bars and the concave plate during the operation of threshing. The rear end of the concave is supported by means of suitable springs 35, said springs being connected to the frame and extending upwardly against the rear end of the concave, said springs being capable of adjustment to enable the concave plate to be adjusted toward or from the path of movement of the threshing-bars. By mounting the rear end of the concave in this manner any liability of the concave being broken by the entrance of any large substance, such as weeds, &c., is avoided, as it would allow the concave to spring away from the path of movement of said bars, and when said weeds are carried beyond the concave the springs would tend to throw the concave back to its normal position. The surface of the concave is formed exactly as shown in Fig. 8, having a series of openings 36, each of which has its upper end enlarged, as at 37, the entire concave plate having the appearance of a perforated plate, the perforations being enlarged on the upper face. The openings 36 are arranged close together, so that the enlarged portion 37 will form sharp edges between each two openings, forming practically what might be termed a "corrugation."

The object of the corrugated form of the concave plate can best be demonstrated by describing the portion of the machine by which especially this process is effected.

As the machine moves forward the shafts 27 are rotated rapidly, thus imparting a movement to the threshing-bars 30. The height of the teeth 26 having been regulated, as hereinafter set forth, so that about six inches of the tops of the stalks, comprising practically the heads, extend above the teeth, the moving threshing-bar comes in contact therewith and carries the row of heads backward onto the concave plate. The threshing-bar 30, as shown in Fig. 9, has its front face rounded, as shown, and has the rear portion of its face corrugated. As the row of heads is drawn onto the concave the rounded portion of the threshing-bar presses the heads downward onto the bar and flattens it, so that practically there is but a single layer of the heads. This movement forces the grain in the pods or shells into the corrugations formed on the concave plate, the sharp edges of which tend to break the pod or shell, thus releasing the grain therefrom. The grain upon being released from the pod passes downward through the openings 36 into a receptacle 38, located thereunder, the corrugated portion of the bars being adapted to break open the shells or pods which were not broken by the rounded portion of the bars. It will be readily seen that the movement of the threshing-bar, together with its form of face, does not break off the heads of the grain, the first movement of the bar tending to flatten it and hold it in position, as well as to break open the pod and allow the grain to escape through the openings into its receptacle. After the grain has been removed the heads are drawn forwardly and pass out in the direction in which they came in, this movement being accomplished before the next row of heads is brought into operative position on the concave.

A plate 39 is connected at the rear of concave plate 31 to the spring 35 and extends rearwardly and upwardly, as shown in Fig. 5, this plate being adapted to receive any grain which may be thrown rearward by the threshing operation, such grain being allowed to drop downward on said plate and through an opening formed between the concave and said plate, said grain passing into the receptacle 38 in an obvious manner.

Within the receptacle 38 is mounted a conveyer having its spiral convolutions extending from opposite ends to the center, thus causing the grain thrown into the receptacle to be carried toward the center, where it passes into a suitable receptacle formed at the lower end of an elevator of suitable construction, not forming a particular part of the present invention, and carried upward therein and deposited within a receptacle 41, mounted on the elevator, said receptacle having openings 42 for the passing of the grain into suitable bags secured thereunder, said bags being held in position by means of suitable spring-arms 43, as shown in the drawings. The conveyer 40 is operated by suitable sprocket-wheels 44, operatively connected therewith, said sprocket-wheels being adapted to contact with the sprocket-chain 34, as shown in Fig. 2, as it passes between sprocket-wheels 32 and 33, each section of the conveyer being provided with a separate sprocket-wheel in order that the conveyers may operate at the same time as the threshing-cylinder, as hereinbefore set forth.

The bag attachment is operated by means of a suitable belt 45, mounted on a pulley or wheel secured on one of the shafts 27, the opposite end of the belt being passed over a suitable wheel connected to the elevator mechanism, as best shown in Figs. 1 and 2.

46 designates a lever pivotally connected at its front end to the axle at about its center. This lever is connected to the frame 6, and particularly to the plate 15, by means of a suitable U-shaped bracket 47, having its sides provided with elongated slots 48, provided for the reception of a pin 49, which extends through said slots and through said lever, said pin being adapted to be tightened by means of a nut mounted on the end thereof, the construction being such as to allow of the lever being moved upward and downward within said bracket adjustably, yet allowing of its being secured in any of its adjusted positions in said bracket.

Inasmuch as the entire mechanism is practically balanced on the axle and has a pivotal movement thereon, it will be readily seen that in view of the connection between the plate 15 and the lever 46 if the rear end of said lever is raised or depressed the threshing mechanism at the front of the machine will be raised or lowered to a relative degree. This movement allows of the adjustment of the threshing mechanism in order that the varying height of the grain may be readily obtained and cut, the adjustment being such as will give the teeth 26 the proper height for directing the heads of the grain into the path of movement of the threshing-bars. This adjustment is intended to be used to a greater extent than that of the entire frame on the axle, as hereinbefore described, the intention being to make a relative adjustment prior to entering the field where the grain is standing, the true adjustment being obtained after the thresher has entered into the field.

In order that the lever 46 may be held in its adjusted position, I provide a suitable toothed segment 50, secured to the rear frame, hereinafter described, said segment being located in the path of movement of a suitable spring-actuated pawl 51, secured at the rear end of said lever. As the threshing mechanism is somewhat heavier than the mechanism located on the rear side of the axle, the normal tendency of the mechanism is to press downward, and thereby force the lever 46 upward. It will be readily seen, therefore, that to change the relative height of the teeth by the movement of the lever pressure is necessary only in one direction—a downward pressure—thereby raising the front of the machine, the opposite movement being accomplished by means of the weight of the threshing mechanism at the front.

The rear portion of the machine is formed substantially as shown in the drawings and comprises a frame to receive the draft-animals in order that they may be placed directly in the rear of the threshing mechanism. This frame consists, essentially, in a laterally-extending bar 57, to which are affixed, near its opposite ends, guide-wheels 52, which also support the rear of the frame. The frame is completed by the use of two forwardly-extending bars 53, having their front ends provided with a suitable eye 54, adapted to be placed on the axle of the machine outside of the drive-wheels and be held in position thereon by suitable means, such as a pin 55. Within the frame so formed the draft-animals are placed, said draft-animals being passed therein by releasing the eye 54 from the axle and allowing the side bars to drop until the animals are in position, after which the side bars are raised into position and secured therein by means of the pin 55. The draft-animals are attached, by means of a suitable doubletree and singletree, to a bar 56, having its ends attached to the laterally-extending portion of the frame 57 at a point away from the center in order that the pull exerted by these animals will be better distributed along said portion of the frame. To this bar 56 is also connected the segment 50, hereinbefore described, said segment being in this manner held securely against movement.

As hereinbefore stated, the guide-wheels are pivotally connected to the bar 57 by means of suitable bearings 58, said bearings retaining a fixed position near the ends of the said bars 57, the guide-wheels being pivotally mounted in said bearings. As shown in the drawings, the guide-wheels proper are mounted on suitable standards, to which are connected suitable forwardly-extending plates 59, said plates being connected by means of a suitable bar 60, pivotally connected at its center to a suitable foot-lever 61 and a hand-lever 62, said levers being pivotally connected to a forwardly-extending U-shaped portion 63, connected to the bar 57, as shown in the drawings. It will be readily seen that if either the foot or hand lever be oscillated the plates 59 will be moved on their pivots in similar directions, thus enabling the machine to readily make its turns. A seat 64ª is secured to the bar 57, in the center thereof, and upon this the driver is located, having under his control both the foot and the hand levers, together with the lever 46.

In using the apparatus herein shown and described it is necessary that two men be employed, one to drive the draft-animals and to attend to the guiding of the threshing-machine, the other to attend to the bagging of the grain as it is threshed, his duties being to place the bags in position and take them away from the bag-holding device after being filled, this being done by dropping them off of the platform 22 centrally, so that the draft-animals will not pass onto or contact with the grain as it is dropped. This attendant stands or is located on the platform 22, and his being near the front of the machine gives him a better position to judge as to the proper height for the teeth to be placed. In order, therefore, that this attendant may be able to regulate the height of the teeth as well as the driver, I have provided a mechanism which I will now proceed to describe, this mechanism being intended to lower the rear end of the lever 46, the raising of this end of the lever being accomplished by the weight of the fore part of the machine, as hereinbefore described. This mechanism consists of a bell-crank lever 64, pivotally mounted on the axle, said bell-crank lever having a pawl 65, adapted to engage with one of the notches in a suitable segmental portion 66. To one of the arms of the lever 64 is secured the front end of a rope or other suitable device, the rear end of which is adapted to be passed through a pulley 67, secured on the bar 56, the rope then being carried over a pulley 68 on the lever 46 and then brought downward and secured positively to said bar 56. By this construction it will be readily seen that when it is desirable that the attendant at the front end of the machine shall raise the teeth the lever 64 is grasped, the pawl being released from contact with the segment 66 and the lever drawn upwardly, which through the medium of the rope connection causes the rear end of the lever 46 to be drawn downward. It will be readily understood, of course, that when the attendant at the front of the machine is regulating the lever the pawl 51 will be tied down, so as not to engage with any of the notches on the segment 50, thus allowing the rear end of the lever to be free to be moved when the front attendant draws upwardly on the bell-crank lever 64. When the rear attendant or the driver attends to raising of the lever 46, the bell-crank lever is allowed to work freely by the tying down of the pawl 67, so as not to contact with the segment 66.

In the drawings the teeth 26 are arranged in such manner as to drive the grain into the path of the threshing-bars, so that none of the grain will be left without being threshed. It will be readily seen that when grain is being threshed in which the stalks are of uneven height even though longer stalks are encountered the threshing will be accomplished in the same manner, in such cases the longer stalks being caught by the revolving threshing-bars at a lower point, forcing the heads onto the concave to a greater distance.

The operation of the machine is very simple and substantially as follows: The machine is driven in the field in which operations are to be commenced, and the frame 6 is adjusted to its approximate position by means of the lever 11, the frame being secured in position on the axle in the manner heretofore described. After being adjusted the machine is driven into the field and the proper adjustment of the lever 46 is made, when the operations are commenced and the grain threshed by the movement of the threshing-bars across the concave in the manner heretofore specified. The threshed grain passes through the concave into the conveyer and is then passed by the conveyer into the receptacle at the lower end of the elevator, from which it is passed into the receptacle 41 and then into the bag, the receptacle being arranged in such manner as to allow the grain to pass to one bag at a time in order that time may be given to allow of the disposal of the filled bag. The bags are then dumped from the platform and afterward picked up and carried to the granary in any suitable manner.

Having thus described my invention, what I claim as new is—

1. In a threshing-machine, drive-wheels, an axle pivotally mounted therein, vertical guides, a frame mounted on said axle and movable in said guides and held against independent pivotal movement thereon, said frame and axle having combinedly a pivotal movement, means for adjustably securing said frame vertically on said axle, means for imparting a pivotal movement to said frame, and axle, and threshing mechanism carried by said frame and operatively connected with the driving-gear.

2. In a threshing-machine, drive-wheels, an axle pivotally mounted therein, vertical guides, a frame mounted on said axle and movable in said guides and held against independent pivotal movement thereon, said frame and axle having combinedly a pivotal movement, means for adjustably securing said frame on said axle, the point of connection between said frame and axle being located intermediate the top and bottom of the frame, means for imparting a pivotal movement to said frame and axle, and threshing mechanism carried by said frame and operatively connected with the driving-gear.

3. In a threshing-machine, drive-wheels, an axle pivotally mounted therein, vertical guides, a frame mounted on said axle and movable in said guides and held against independent pivotal movement thereon, said frame and axle having combinedly a pivotal movement, means for adjustably securing said frame vertically on said axle, means for imparting a pivotal movement to said frame and axle, means for limiting the movement of said axle, a threshing mechanism carried by said frame and means operatively connecting the same with the driving-gear.

4. In a threshing-machine, drive-wheels, an axle pivotally mounted therein, vertical guides, a frame mounted on said axle and movable in said guides and held against independent pivotal movement thereon, said frame and axle having combinedly a pivotal movement, means for adjustably securing said frame vertically on said axle, means for imparting a pivotal movement to said frame and axle, means for limiting the movement of said axle, a lever and means for varying the angular relationship of said lever and frame, a threshing mechanism carried by said frame, and means operatively connecting the same with the driving-gear.

5. In a threshing-machine, drive-wheels, an axle pivotally mounted therein, vertical guides, a frame mounted on said axle and movable in said guides and held against independent pivotal movement thereon, said frame and axle having combinedly a pivotal movement, means for adjustably securing said frame vertically on said axle, means for imparting a pivotal movement to said frame and axle, means for limiting the movement of said axle, a lever extending rearward from the axle and having adjustable connections with said frame intermediate the axle and the rear end of the lever for varying the angular relation of the lever and frame, means for controlling the movement of said lever pivotally on the axle, a threshing mechanism carried by said frame, and means operatively connecting the same with the driving-gear.

6. The combination with a wheeled axle; and a threshing-mechanism-supporting frame adjustably secured thereon; of draft-applying and steering mechanism located in rear of said axle and frame, said mechanism being connected solely to said axle and detachable therefrom.

7. The combination with a wheeled axle; and a threshing-mechanism-supporting frame adjustably secured thereon; of draft-applying and steering mechanism located in rear of said axle and frame, said mechanism being connected solely to the outer ends of said axle and detachable therefrom.

8. The combination with a wheel-carrying frame; of an independent frame located in rear of said carrying-frame and removably connected to the ends of the axle thereof to form an inclosure for the draft-animals; and steering mechanism carried solely by said inclosing frame, substantially as described.

9. In combination, a threshing-cylinder having its operating portion formed to exert a gradually-increasing pressure; and a concave disposed eccentrically to the advance portions of said portion and having a series of countersunk openings formed therein for the passage of grain, the edges of each two contiguous openings lying substantially close together to form an exposed surface of corrugated formation, whereby the grain will be forced from its pod and through said openings substantially free from chaff.

10. A concave for threshing-machines having its operative face free from projections, and formed with a series of spaced countersunk openings for the passage of grain, the edges of each two contiguous openings being sharp and lying substantially close together to form a narrow division-line, whereby the surface will have a corrugated formation.

11. In combination, a yieldable concave having countersunk openings for the passage of the grain; and a threshing-cylinder rotating thereover and in juxtaposition thereto, said concave being disposed eccentrically to the advancing portions of the cylinder-bars, said cylinder forcing the grain-pods onto the concave, and the grain into and through said openings with gradually-increasing pressure.

In witness whereof I have hereunto set my hand in the presence of two witnesses.

WILLIAM MALONEY.

Witnesses:
J. A. MARION,
HORACE G. SEITZ.